Figure 1:
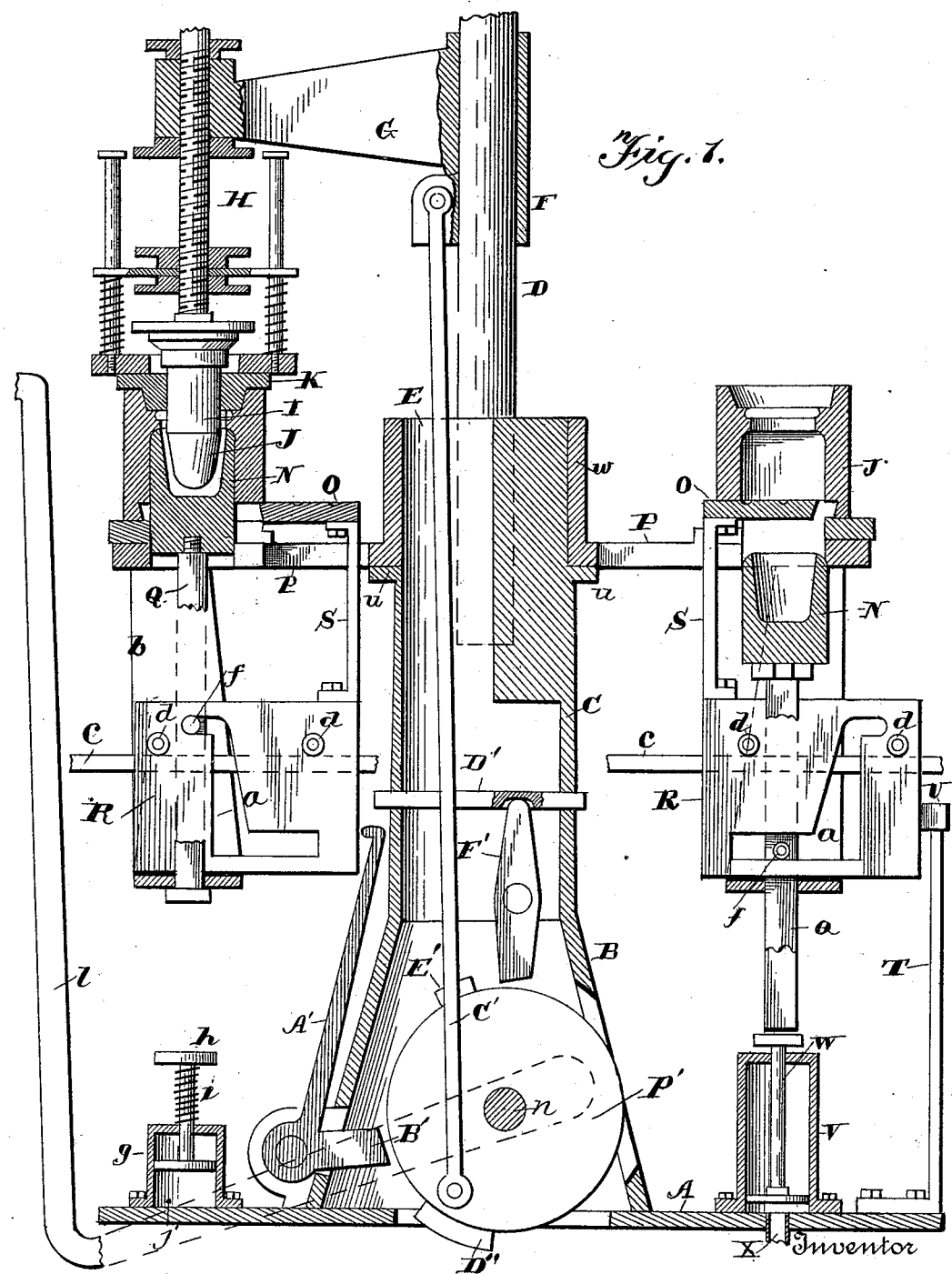

(No Model.)  4 Sheets—Sheet 1.

C. E. BLUE.
MACHINE FOR MANUFACTURING GLASS BOTTLES, &c.

No. 567,071.  Patented Sept. 1, 1896.

Witnesses  Inventor
Geo. E. Frech  C. E. Blue
James W. Bevans  by Pattison & Neshit
  Attorneys (No Model.) 4 Sheets—Sheet 2.
C. E. BLUE.
MACHINE FOR MANUFACTURING GLASS BOTTLES, &c.
No. 567,071. Patented Sept. 1, 1896.
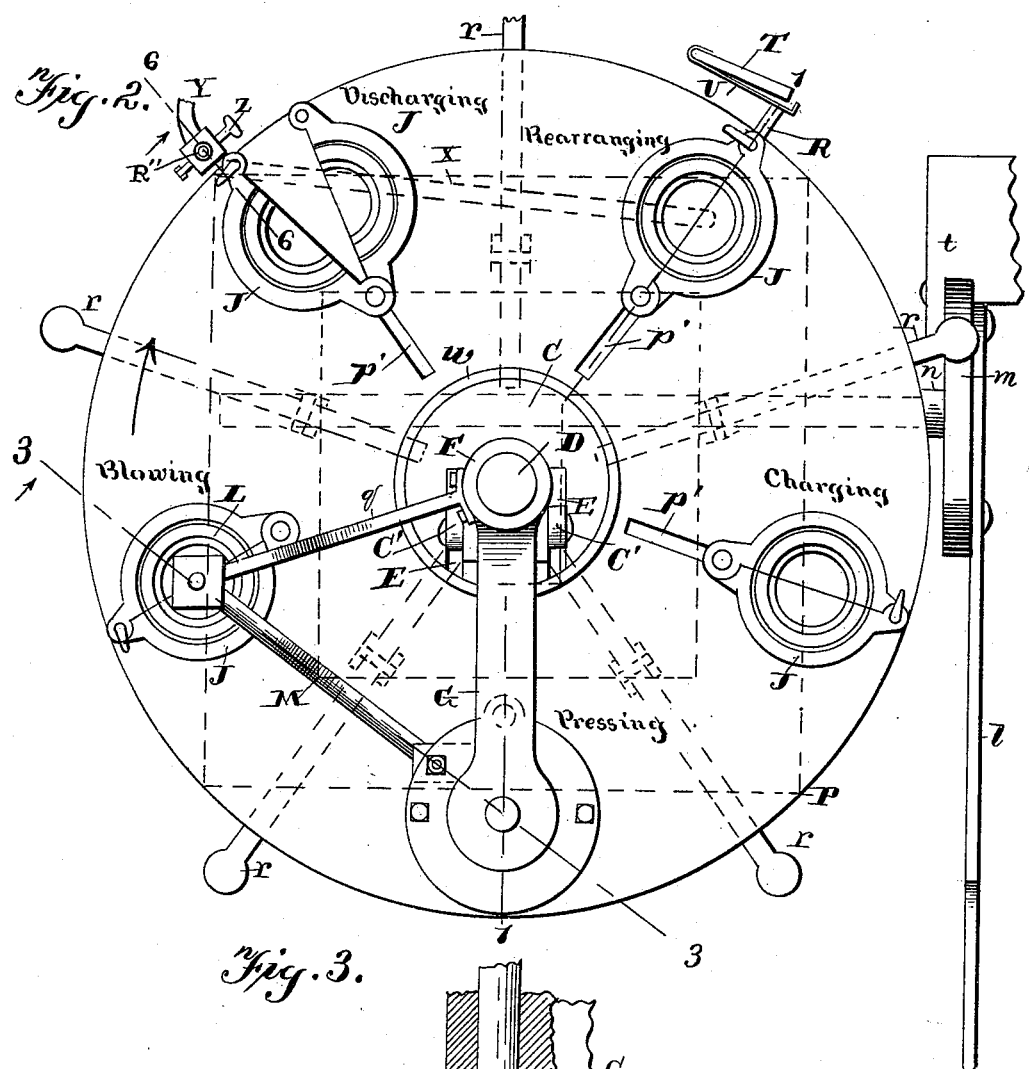
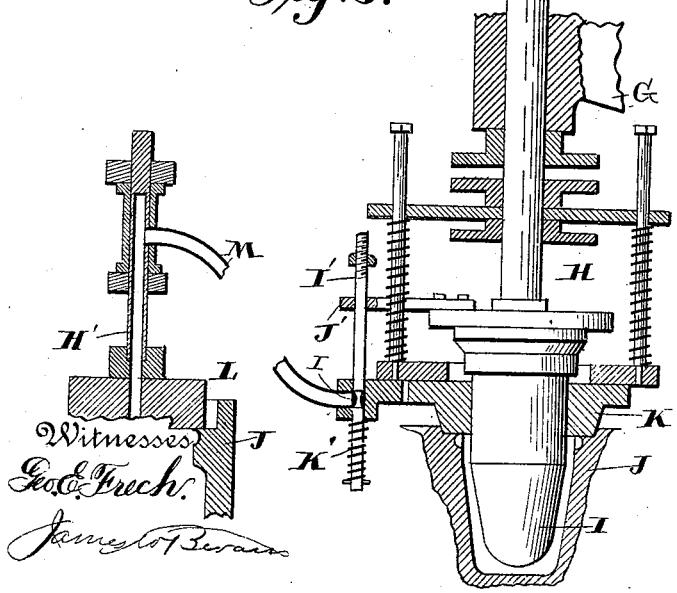

(No Model.)
C. E. BLUE.
MACHINE FOR MANUFACTURING GLASS BOTTLES, &c.
No. 567,071. Patented Sept. 1, 1896.
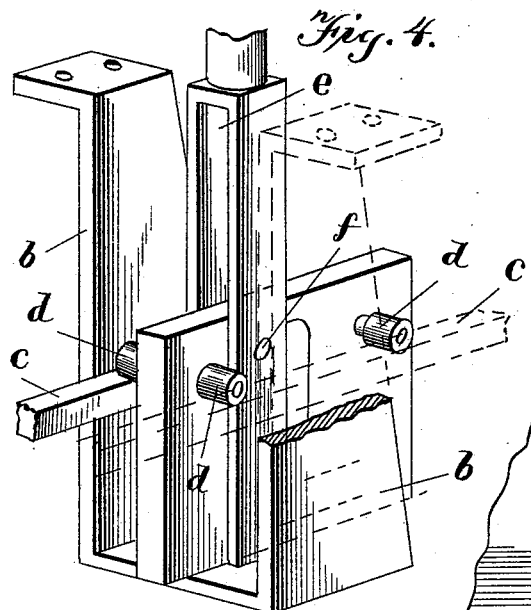
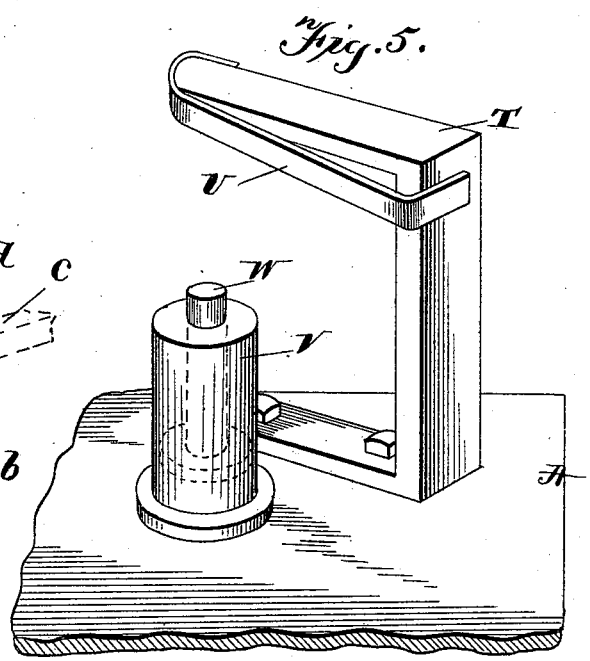
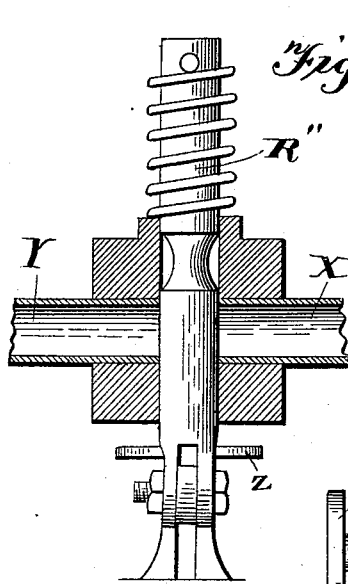
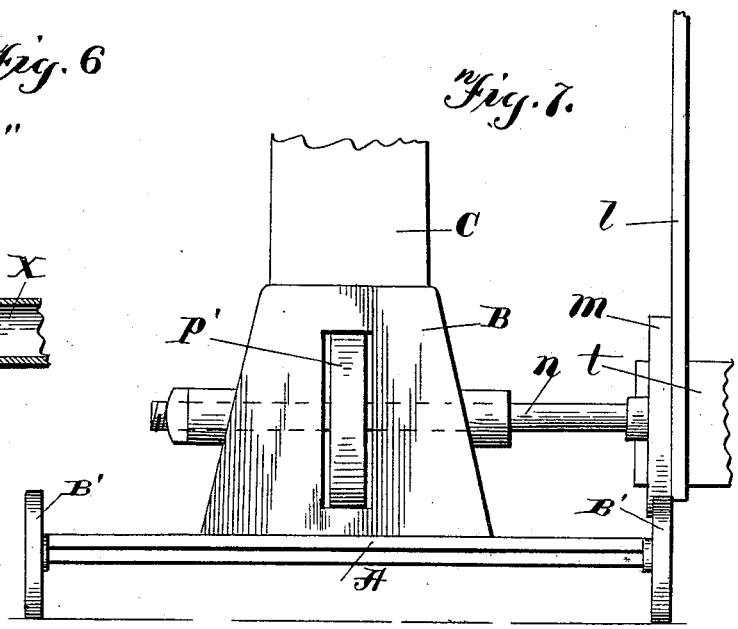

(No Model.)  4 Sheets—Sheet 4.
C. E. BLUE.
MACHINE FOR MANUFACTURING GLASS BOTTLES, &c.
No. 567,071.  Patented Sept. 1, 1896.
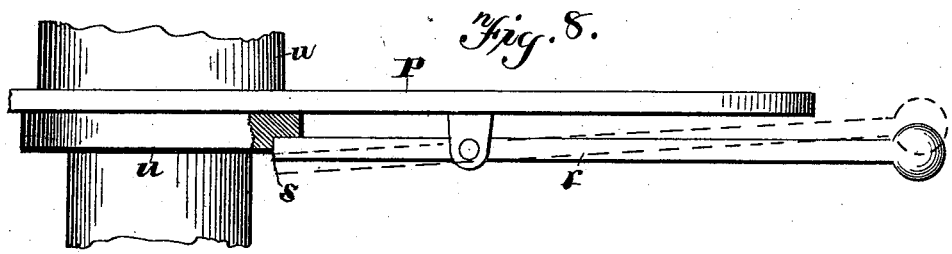
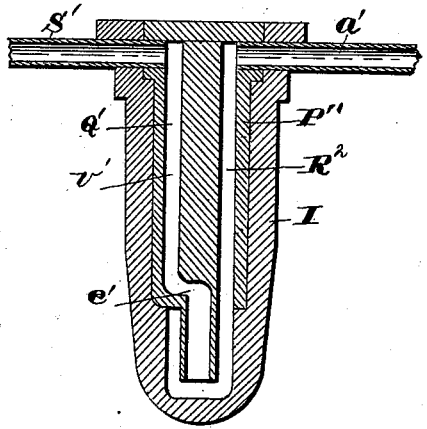
Witnesses
Geo. E. Frech
James ...
Inventor
C. E. Blue,
By Attorneys
Pattison ...

UNITED STATES PATENT OFFICE.

CHARLES EDWIN BLUE, OF WHEELING, WEST VIRGINIA, ASSIGNOR OF ONE-FOURTH TO ARTHUR G. HUBBARD, OF SAME PLACE.

MACHINE FOR MANUFACTURING GLASS BOTTLES, &c.

SPECIFICATION forming part of Letters Patent No. 567,071, dated September 1, 1896.

Application filed January 18, 1896. Serial No. 575,999. (No model.)

*To all whom it may concern:*

Be it known that I, CHARLES EDWIN BLUE, of Wheeling, in the county of Ohio and State of West Virginia, have invented certain new and useful Improvements in Machines for the Manufacture of Glass Bottles, &c.; and I do hereby declare the following to be a full, clear, and exact description of the invention, such as will enable others skilled in the art to which it pertains to make and use it, reference being had to the accompanying drawings, which form part of this specification.

My invention relates to improvements in machines for manufacture of glass bottles, jars, and similar articles, and it pertains to that class of machines in which the article is blown to conform to the inner contour of the mold.

The primary object of my invention is to increase the speed and decrease the cost of production by a continuous operation wherein a charging, pressing, blowing, and discharging operation, and preferably refixing or rearranging a discharge-mold, are separately but simultaneously carried on, whereby a completed article is delivered at each operation of the machine.

A further object of my invention is to provide a table capable of and having a rotary movement in one direction, the table carrying a series of molds situated at practically equal distances apart, and to provide blowing and pressing heads at fixed distances corresponding with the distance between the molds upon the rotatable table, whereby the blowing and pressing heads will fit upon any two of the molds throughout the rotation of the table. I attain the speed in production and a decrease in cost by providing a series of molds arranged at equal distances upon a rotating table, so that each mold is successively and separately, at each operation of the machine, respectively a charging, pressing, blowing, discharging, and, preferably, a rearranging or fixing mold.

The object of my invention further relates to an arrangement of mechanisms whereby the presser, by a single operation, presses the glass in one mold, and simultaneously, by the same movement, blows the glass in the succeeding mold, and also to an arrangement of mechanisms whereby the discharging or removing boy, while removing a completed article from the discharging-mold, can at the same time refix or rearrange the bottoms in the previously-discharged mold.

The arrangement of the machine is such that the presser, in addition to simultaneously pressing and blowing, by a single movement of a lever—that the return movement of the lever in the opposite direction to its normal position—causes the primary or pressing bottom to be dropped and the secondary or blowing bottom to be moved into position automatically, ready for the blowing operation when the mold in which the pressing operation was performed reaches the next step or movement in the rotation of the table.

As will appear fully in the description, the rearranging-mold may be omitted, and instead of providing a series consisting of five molds, the series may be reduced to four—namely, charging, pressing, blowing, and discharging molds—and in which instance the discharging-boy, immediately upon closing the mold, may either by hand or by a suitable mechanism replace or rearrange the bottoms in the mold, as will be readily understood. The automatic arrangement whereby the return of the pressing-lever by the presser automatically drops the primary or pressing bottom and moves into position the blowing or secondary bottom is desirable in a machine for small articles, while it is not quite so well adapted in a machine making larger articles. In a machine for manufacturing large articles I would probably use a handle attached to the slide for dropping the bottoms. I do not, therefore, in view of these considerations, restrict my invention to the use of a rearranging or refixing mold, though I preferably desire to use it, nor do I restrict my invention to the use of the automatic devices for dropping the primary or pressing bottom and throwing into position the secondary or blowing bottom.

In the accompanying drawings, Figure 1 is a vertical section taken on the dotted line 1 1 of Fig. 2. Fig. 2 is a top plan view of the machine. Fig. 3 is a section showing the presser mechanism and the blowing-head, taken on the dotted line 3 3 of Fig. 2. Fig. 4 is a detached perspective view of the hangers beneath the molds. Fig. 5 is a detached perspective view of the spring and cylinder for refixing the bottoms in the molds. Fig. 6 is an enlarged sectional view taken on line 6 6 of Fig. 2. Fig. 7 is a side elevation of the lower portion of the base and supporting frames. Fig. 8 is an enlarged detail view of one side of the table, showing the handles for rotating it and locking it in position for operation. Fig. 9 is an enlarged sectional view of a plunger having waterways for conveying water within the same throughout its length and keeping it cool.

Referring now to the drawings, A indicates a base preferably upon supporting-wheels B', as represented in Fig. 7, so that the machine may be readily rolled around to any part of the factory desired. Extending from the center of this base A is an angular housing B, upon which is placed the vertical support or standard C. The standard C is made hollow at its lower end, as shown in Fig. 1, and from the hollow portion upward is provided at each side of its center with the oblong openings E, as shown in the plan view, Fig. 2, and in the section, Fig. 1. Supported in the standard C is a post or standard D, upon which the sleeve or collar F slides vertically, and formed as a part of or firmly secured to the sleeve F is an outwardly-projecting arm G, carrying the pressing mechanism H. This pressing mechanism is essentially the usual form, with one difference, in that the plunger has an independent movement downward before the springs of the pressing mechanism are engaged. This is for the purpose of admitting air to the blowing-head immediately upon the downward movement of the plunger, and which increases the downward movement or distance the plunger moves, so as to prolong the time of blowing in the blow-mold, all of which will be more particularly referred to hereinafter. However, this independent movement is not absolutely necessary, though desirable, and the ordinary pressing mechanism may be used without variation.

The plunger I is carried by the arm G, and the ring K is carried by the lower spring-plate of the pressing mechanism in substantially the usual manner. The upper portion C of the housing is provided with a lateral annular flange $u$, upon which rests the table P, the latter having an upwardly-projecting flange $w$ for holding it against lateral play or wabbling, so that it is held firmly in a horizontal position. Placed in fixed positions upon the table are the five molds J, one for pressing, one for blowing, one for discharging, one for rearranging, and one for charging, all of which are clearly indicated in Fig. 2. These molds are preferably formed in two vertical sections and will be provided with the usual handles and fastening devices, so that they may be opened and closed, neither of which form any part of my present invention and need not be more specifically shown or particularly described, for the reason that in the formation of some articles a non-sectional mold may be used in the machine without varying my invention in any respect. These molds J are at equal distances apart about the circular table P, and, as before stated, the presser-head is carried by the arm G, and a blowing-head L is likewise carried by the arm G, through the medium of a brace $q$ and the air-inlet pipe M, extending from the pressing head or mechanism to and assisting in supporting the blowing-head L, as clearly shown in Fig. 2. The presser and blowing heads are supported at fixed distances apart, corresponding, practically, with the distances between the several molds upon the table P. The reason for this is to cause the pressing and blowing heads to register or fit upon any two of the molds throughout the rotation of the table for the purpose of pressing and blowing simultaneously.

Each of the molds J is provided with a primary or pressing bottom N and a secondary or blowing bottom O. The primary bottom N has a vertical movement and the secondary bottom O a horizontal movement. The secondary bottom is supported by the slide R in each mold, and the slide R is in turn supported by a U-shaped yoke $b$, having its upper outturned ends bolted to the table. The particular manner of supporting the slide is by means of flanges or ways $c$, secured to the inner walls of the yoke $b$ and the laterally-journaled wheels $d$, which run thereupon. Each of the slides R is provided with substantially a Z-shaped slot $a$, with which a laterally-projecting pin $f$ of a slotted rod Q engages. This vertically-slotted rod Q is screwed directly into the under side of the primary bottom N of the mold, and the vertical slot $e$ extends from end to end thereof. The lower end of the slotted rod Q passes through the bottom of the yoke $b$ and is guided thereby in its vertical movement. The slides R pass through the slots $e$ of the rods Q and move back and forth therein for the purpose of supporting the primary bottom in its upward position and the secondary bottom in its outward position and for permitting the primary bottom to drop and to carry the secondary bottom inward into position for the blowing operation. The outward movement of this slide may be accomplished by hand through the medium of a handle attached thereto or through the medium of an automatic mechanism to be fully described farther on.

The flange $u$, which supports the table P, is provided with a recess $s$, adapted to be engaged by the combined locking and turning handles $r$, which are pivoted to the under side of the table. There are preferably the same number of handles as molds, and the recess $s$ is so positioned as to be engaged by the handle $r$ at the right-hand side of the pressing-mold within reach of the presser, who causes the pressing through the movement of the lever $l$. This lever $l$ is rigidly connected with the shaft $n$ through the medium of the wheel $m$, which is itself firmly connected with the shaft, and the shaft at its center is in the housing B and provided with a wheel $p$, to which the lower end of the two pitmen C' are eccentrically connected, the opposite ends of the pitmen being pivotally connected with the sleeve F, which carries the arm G, so that when the lever $l$ is moved downward the pressing and blowing operation are simultaneously performed by carrying the pressing and blowing heads in position upon the blowing and pressing molds. Connected with the blowing-head L is a tube H', and this tube is in communication with the pipe M, and the pipe M is in communication with an air supply from any desired source in the factory. A valve I regulates the admission of air to the pipe M, and consequently the admission of air through the blowing-head into the blowing-mold. This is regulated by means of an arm $j'$, extending outward from the plunger, through which the upper end of the valve-stem I' passes, and the lower end of the valve is provided with a spring K, which holds it downward. When it is in its downward position, air is admitted within the pipe M and through the pipe to the blow-head and blowing-mold, but when the plunger is raised after the pressing operation the arm $j'$ engages the nut upon the upper end of the valve-stem I', thus lifting it and cutting off the air. By this construction air is admitted as soon as the plunger has moved downward a fraction of an inch, about half an inch, more or less, and air is then admitted until the pressing operation has been completed, and is cut off by the plunger I reaching the upward limit of its movement. Just before the completion of this movement the arm $j'$ strikes the nut upon the valve-stem I' and lifts it up against the tension of the spring K, thus cutting off the air, as will be readily understood. This construction just described is clearly shown in Fig. 3, which will be clearly understood.

Placed just in advance and extending to the rearranging-point of the molds, as shown in Fig. 2, is a standard T, carrying a spring U, as shown in Figs. 2 and 5, the function of which spring is to cause an inward movement upon the slides as they come to that point in succession. When the molds reach the rearranging-point, they are over the pneumatic cylinder V, carrying a piston-head W, and the lower end of the slotted rod Q is directly over the upper end of the piston-rod W. A pipe X extends partly across the machine to the discharging-mold, as shown in dotted lines in Fig. 2, and at this point is a valve R'', normally held closed by means of a spring, and to this valve is connected an ordinary treadle Z to be operated by the discharging or removing boy. A pipe Y is connected to any suitable air-supply in the factory, so that when the boy is discharging the slide at the rearranging position has been moved partly inward, and by pressing upon the treadle air is admitted to the cylinder V, forcing its piston upward and carrying with it the standard or rod Q and the primary bottom N. This construction, owing to the arrangements previously described, simultaneously moves the secondary or blowing bottom within the mold, so that the primary bottom fills the same ready for the charging when the mold reaches the charging-point.

Placed beneath the pressing-mold is an air-cushion $h$, formed by an air-cylinder $g$, having a very small air-outlet $j$, and around the piston-rod is a spring $i$, adapted to return the same when it has been depressed. The object of this is to receive the jar of the dropping primary bottom after the slide R has been slightly moved inward to cause the pin $f$ to register with the vertical portion of the Z-shaped slot. The spring $i$ returns the air cushion or piston to position, as will be readily understood. I here show a mechanism for automatically moving the slides outward when the molds are in the pressing position, consisting of an endwise-moving bar D', with which an intermediately-pivoted lever F' engages, and by means of a bell-crank lever A', its upper end being adapted to engage the slide and its lower end to be engaged by a cam or projection D' upon the wheel $p$. The intermediately-pivoted lever F' is likewise adapted to be engaged by the projection or cam E' upon the same wheel.

The operation of this part of my invention is as follows: When the presser pulls downward upon the lever $l$, the pressing and blowing operations are performed, as before described, and when the lever is moved backward before the table is rotated the cam or projection E' upon the wheel $p$ engages the lower end of the intermediately-pivoted lever F', thus moving the rod D' outward and forcing the slide R outward sufficiently to bring the pin $f$ in line with the vertical portion of the Z-slot $a$. The primary bottom then drops, being received by air cushion or piston $h$, as before described, for the purpose of preventing any sudden jar and injury to the parts, and then the continued movement of the lever $l$ causes the wheel $p$ to rotate further, bringing the cam or projection D'' in contact with the short end of the bell-crank lever A', thus forcing its upper end outward and moving the slide outward the distance of the lower horizontal portion of the Z-shaped slot $a$. This carries the blowing or secondary bottom O into position for the blowing operation, and the table is turned one notch by the presser taking hold of the handles $r$ at his left and lifting it up and disengaging it from the notch and causing the table to rotate, which carries the pressing-mold to the blowing position and the charging-mold to the pressing position. As before described, the automatic dropping of the primary bottom may be omitted without departing from the other part of my invention by supplying a handle to the slide R.

In order to prolong the blowing operation, I preferably, though not necessarily, permit the movement of the upper plate of the pressing mechanism before it is engaged by the springs, and the valve I' is arranged so that as soon as the presser-head moves downward a slight distance air is admitted, so that the blowing operation (where the independent movement is provided) begins before the plunger actually engages the glass within the pressing-mold. The air continues to be in communication with the blowing-mold until the plunger passes downward into the glass and is withdrawn again, when, as before described, the valve is lifted through the medium of the arm $j'$, carried by the plunger. In this manner the presser rotates the table, presses and blows the article, the two latter operations being performed by a single movement.

From the above description it will be seen that the table is continuously rotated in one direction, bringing first one of the molds to the charging position and then the next one to that position, carrying the previously-charged mold to the pressing position and the pressing-mold to the blowing position, and the blowing-mold to the discharging position, and the discharging-mold to the rearranging or refixing position. From the fact that the blowing and pressing heads are at fixed distances corresponding to the distances between the molds upon the table, it will be seen that when the machine has made one rotation a completed article is delivered at the discharging-point at each movement of the table. This arrangement enables me to manufacture bottles, jars, and similar articles very rapidly and to do away with considerable of the help necessary with the machines now in use, it requiring only three persons to operate five molds. The discharging-boy discharges and rearranges the parts in the succeeding molds, the presser presses, blows, and rotates the table, and another boy charges the mold. It enables me to perform the work very rapidly and accurately, so that the articles are uniform throughout, making a great saving in expense of production.

As mentioned in the first part of the specification, the rearranging or refixing mold may be omitted, so that the table would be reduced in size, or the distance between the molds increased, so that the circle would be divided into four equal parts. In this event means would be provided at the discharging-point for the discharging-boy to refix the bottom as soon as the mold had been discharged. However, I prefer to have a refixing or rearranging mold, as it is a saving in time, in that the bottoms are refixed or rearranged simultaneously with the removing of the article, so that there is absolutely no waste of time whatever. This same remark applies throughout the entire operation of the machine, in that there is absolutely no time transpiring between any operation performed on the machine. The charging, pressing, blowing, and rearranging are simultaneously operated throughout the machine, so that a completed article is delivered at each operation.

It is very desirable in a machine of this class that there should be a means provided for keeping the plunger cool, owing to the rapid succession in which it is being used. Therefore I preferably use a hollow plunger, as shown in Fig. 9, consisting of a drilled pin P'', having the inlet-channel U' and the outlet-channel $R^2$, by means of which water is continually passed from the inlet-pipe S' to the body and point of the plunger and out the outlet-pipe $a'$. This arrangement enables me to keep the plunger cool, which is very desirable in the rapid succession in which the plunger is being used. The water is continually flowing through the plunger without any intermission whatever through the medium of flexible connections, which need not here be further shown or described, as they will be readily understood by those skilled in the art. So essential is this part of the invention that the speed of the machine would have to be considerably reduced if it were omitted, and by its connection with the rotatable table I am enabled to perform the pressing operation as quickly as the machine can be operated and to do first-class work, which could not be done without any cooling means for the plunger, and it has therefore a special value in this particular connection and combination.

Having thus fully described my invention, what I claim, and desire to secure by Letters Patent, is—

1. In a glass-blowing machine, the combination of an endless carrier, a plurality of molds carried thereby, primary or charging and secondary or blowing bottoms for each mold and carried by said carrier, controllers for said bottoms carried by the carrier, (one for each mold,) and means for operating the controllers and the bottoms.

2. In a glass-blowing machine, the combination with an endless carrier carrying a plurality of molds, of a pressing-head and a blowing-head, the two heads connected and moving together, and an operating means therefor.

3. In a glass-blowing machine, the combination with an endless carrier having a plurality of molds, a pressing and a blowing head, a vertically-movable support above the table and carrying both of said heads whereby they move together, and means for moving the support.

4. In a glass-blowing machine, the combination of an endless carrier carrying a plurality of molds, a pressing-head, a blowing-head, means for operating said heads, an air-supply having communication with said blowing-head, and a valve controlling said air communication, said valve controlled by the pressing-head whereby the blowing-head is seated before the air is admitted thereto.

5. In a glass-blowing machine, the combination of an intermittently-moving endless carrier carrying a plurality of molds, a vertically-movable primary bottom for each mold, and a vertically-movable actuating member for said bottom situated beneath and supported independent of the table and at a point below said molds in advance of the pressing-mold when the table is stationary, a horizontally-movable secondary bottom for each mold, and an actuating member for said secondary bottoms situated in advance of the vertically-movable actuating member, substantially as described.

6. In a glass-blowing machine, the combination of an intermittently-moving endless carrier carrying a plurality of molds, a vertically-movable primary bottom for each mold, and a vertically-movable actuating member for said bottoms, situated beneath and supported independent of the table and at a point below one of said molds in advance of the pressing-mold when the table is stationary, a horizontally-movable secondary bottom for each mold, and an actuating member for said secondary bottoms situated in advance of the vertically-moving actuating member, and at a point to operate the secondary bottom by the movement of the table in advance of the vertical movement of the primary bottom.

7. The combination of a rotatable table, a series of molds carried thereby, a transversely-movable device controlling the bottoms, and a spring fixed in relation to the rotation of the table, said spring engaging and through the movement of the table moving the transverse device, substantially as described.

In testimony whereof I affix my signature in presence of two witnesses.

CHARLES EDWIN BLUE.

Witnesses:
A. T. HUBBARD,
W. B. JONES.